(12) United States Patent
Meier et al.

(10) Patent No.: US 9,969,898 B2
(45) Date of Patent: *May 15, 2018

(54) POLYETHYLENE COMPOSITION FOR HAVING HIGH IMPACT AND STRESS CRACKING RESISTANCE

(71) Applicant: BASELL POLYOLEFINE GMBH, Wesseling (DE)

(72) Inventors: Gerhardus Meier, Frankfurt (DE); Ulf Schuller, Frankfurt (DE); Diana Dotsch, Bad Krueznach (DE); Bernd Lothar Marczinke, Frankfurt (DE); Heinz Vogt, Tegernheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/660,653

(22) Filed: Jul. 26, 2017

(65) Prior Publication Data

US 2017/0321076 A1  Nov. 9, 2017

Related U.S. Application Data

(63) Continuation of application No. 14/900,996, filed as application No. PCT/EP2014/062923 on Jun. 19, 2014, now Pat. No. 9,732,248.

(30) Foreign Application Priority Data

Jun. 25, 2013 (EP) ..................................... 13173536

(51) Int. Cl.
*C09D 123/08* (2006.01)
*C08L 23/06* (2006.01)
(Continued)

(52) U.S. Cl.
CPC ........ *C09D 123/0815* (2013.01); *C08L 23/06* (2013.01); *C08L 23/0815* (2013.01);
(Continued)

(58) Field of Classification Search
CPC ............ C09D 123/0815; C09D 123/06; C08L 2205/025; C08L 23/06; C08L 2308/00; C08L 23/0815; C08L 2314/02
See application file for complete search history.

(56) References Cited

U.S. PATENT DOCUMENTS

| 2010/0222529 A1 | 9/2010 | Michel et al. |
| 2010/0313986 A1 | 12/2010 | Backman et al. |
| 2012/0108766 A1 | 5/2012 | Berthold et al. |

FOREIGN PATENT DOCUMENTS

| CN | 101421313 A | 4/2009 |
| EP | 1972642 A1 | 9/2008 |

(Continued)

OTHER PUBLICATIONS

PCT International Search Report and Written Opinon dated Jul. 15, 2014 (Jul. 15, 2014) for Corresponding PCT/EP2014/062923.

*Primary Examiner* — Michael C Miggins

(57) ABSTRACT

Polyethylene composition with improved balance of impact resistance at low temperatures and Environmental Stress Cracking Resistance (ESCR), particularly suited for producing protective coatings on metal pipes, said composition having the following features:
1) density from 0.938 to 0.948 g/cm$^3$;
2) ratio MIF/MIP from 15 to 25;
3) MIF from 30 to 45 g/10 min.;
4) Mz equal to or greater than 1000000 g/mol;
5) LCBI equal to or greater than 0.55.

20 Claims, 1 Drawing Sheet

(51) Int. Cl.
*C09D 123/06* (2006.01)
*C08L 23/08* (2006.01)
(52) U.S. Cl.
CPC ...... *C09D 123/06* (2013.01); *C08L 2205/025* (2013.01); *C08L 2308/00* (2013.01); *C08L 2314/02* (2013.01)

(56) References Cited

FOREIGN PATENT DOCUMENTS

| | | |
|---|---|---|
| EP | 2072588 A1 | 6/2009 |
| KR | 19910018415 | 11/1991 |
| WO | WO-2007118865 A1 | 10/2007 |
| WO | WO-2010139419 A2 | 12/2010 |

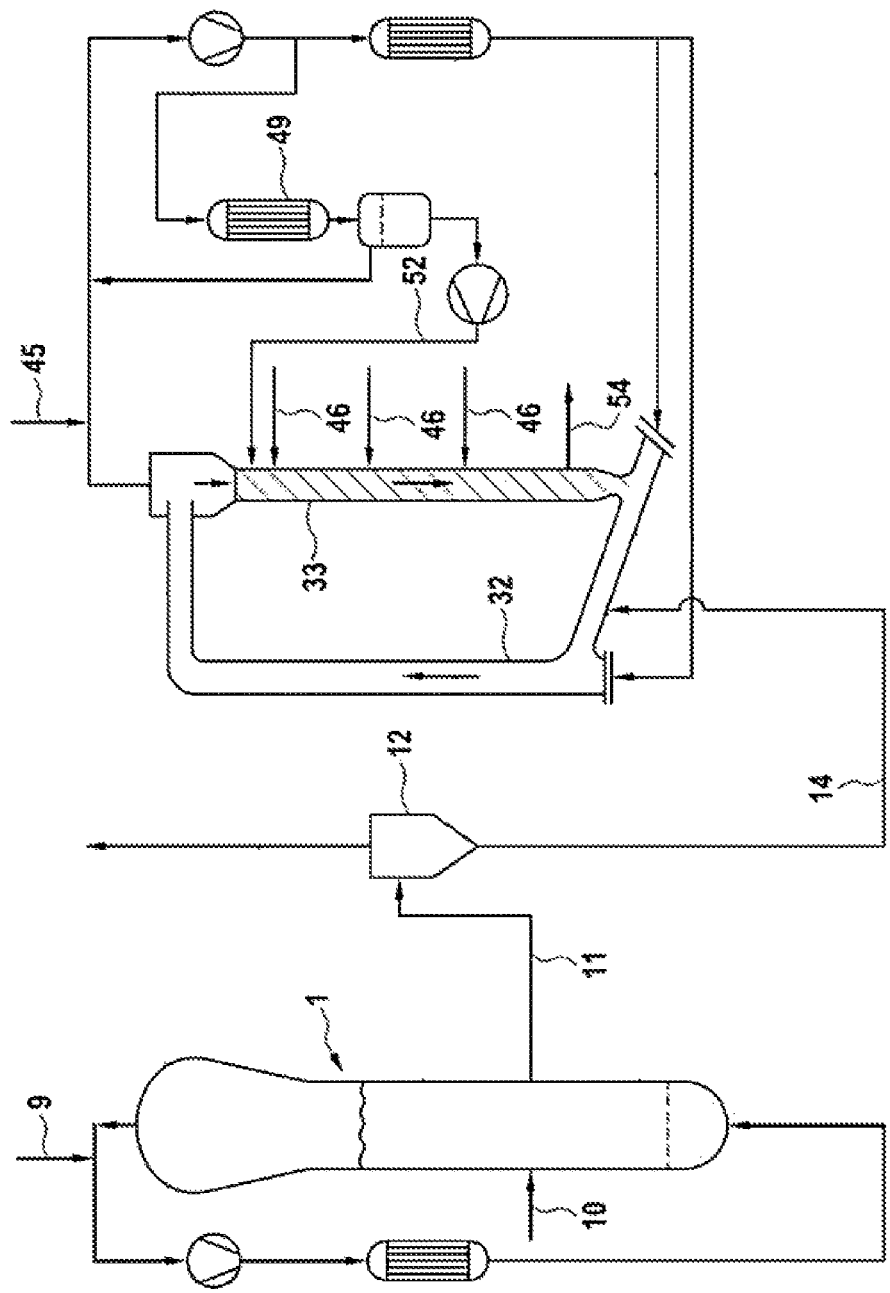

POLYETHYLENE COMPOSITION FOR HAVING HIGH IMPACT AND STRESS CRACKING RESISTANCE

This application is a continuation application of co-pending U.S. patent application Ser. No. 14/900,996 filed Dec. 22, 2015, which is the U.S. National Phase Application of WIPO International Application PCT/EP2014/062923, filed Jun. 19, 2014, claiming benefit of priority to European Patent Application No. 13173536.7, filed Jun. 25, 2013, the contents of which are incorporated herein by reference in its entirety.

FIELD OF THE INVENTION

The present disclosure relates to a polyethylene composition which is suitable for producing protective coatings on metal pipes such as steel pipes.

BACKGROUND OF THE INVENTION

Examples of previously described coating compositions are disclosed in WIPO Pat. App. Pub. Nos. WO 2009080207 and WO2012152421.

SUMMARY OF THE INVENTION

It has now been found that by properly selecting the density and the molecular weights of the composition, an improved balance of impact resistance at low temperatures and Environmental Stress Cracking Resistance (ESCR) is achieved. The polyethylene compositions of the present technology may be melt-processed at unusually high shear rate values, which mean high processing speeds and/or reduced melt-processing temperatures, without encountering flow-instabilities which generally produce unacceptable defects in the final body (e.g. shark skin or melt-fracture), even in the absence of processing aids. The present technology also relates to a multi-stage polymerization process for preparing the polyethylene compositions described herein.

In some embodiments, the present invention provides for a polyethylene composition having the following features:
1) a density from 0.938 to 0.948 g/cm$^3$, such as from 0.940 to 0.945 g/cm$^3$, as determined according to ISO 1183 at 23° C.;
2) a MIF/MIP ratio from 15 to 25, such as from 19 to 23, where MIF is the melt flow index at 190° C. with a load of 21.60 kg, and MW is the melt flow index at 190° C. with a load of 5 kg, both determined according to ISO 1133;
3) a MIF from 30 to 45 g/10 minutes (min), including from 35 to 40 g/10 min, and from 35 to 39 g/10 min;
4) a Mz equal to or greater than 1000000 g/mol;
5) a long-chain branching index, LCBI, equal to or greater than 0.55, including equal to or greater than 0.60; where LCBI is the ratio of the measured mean-square radius of gyration R$_g$, measured by GPC-MALLS, to the mean-square radius of gyration for a linear PE having the same molecular weight.

In certain embodiments, Mz is greater than 1000000 g/mol, including equal to or greater than 1100000 g/mol. In additional embodiments, Mz has an upper limit of 2000000 g/mol, of 1800000 g/mol, and of 1600000 g/mol. In further embodiments, ranges of Mz include:
from equal to or greater than 1000000 g/mol to 1800000 g/mol, from equal to or greater than 1000000 g/mol to 1600000 g/mol; or from 1100000 g/mol to 1800000 g/mol, including from 1100000 g/mol to 1600000 g/mol.

In addition to features 1) to 5) above, the polyethylene compositions of the may also comprise:
6) eta (0.02) from 25,000 to 35,000 Pa·s, such as from 28,000 to 33,000 Pa·s and from 29,000 to 33,000 Pa·s; wherein eta (0.02) is the complex shear viscosity at an angular frequency of 0.02 rad/s, measured with dynamic oscillatory shear in a plate-plate rotational rheometer at a temperature of 190° C.

BRIEF DESCRIPTION OF THE DRAWINGS

These and other features, aspects, and advantages of the present disclosure will become better understood with reference to the following description and appended claims, and accompanying drawing FIGURES where:

FIG. 1 is illustrative of a process-flow diagram of two serially connected gas-phase reactors for use in accordance with various embodiments of ethylene polymerization processes disclosed herein to produce various embodiments of the polyethylene compositions disclosed herein.

It should be understood that the various embodiments are not limited to the arrangements and instrumentality shown in the drawing FIGURES.

DETAILED DESCRIPTION OF THE INVENTION

The term "polyethylene composition(s)" refers to both a single ethylene polymer and an ethylene polymer composition, including a composition of two or more ethylene polymer components that may comprise different molecular weights, where such compositions are called "bimodal" or "multimodal" polymer(s) in the relevant art.

In some embodiments, the polyethylene compositions of the present technology comprise one or more ethylene copolymers. All the features herein defined, comprising the previously defined features 1) to 6), refer to the ethylene polymers and/or ethylene polymer compositions described herein. The addition of other components, like additives normally employed in the art, can be used to modify one or more of features of the ethylene polymers and/or ethylene polymer compositions. In some embodiments, the presence of carbon black may increase the density of the polyethylene compositions up to 0.953-0.963 g/cm$^3$.

The ratio MIF/MIP provides a rheological measure of molecular weight distribution. Another measure of the molecular weight distribution is provided by the ratio Mw/Mn, where Mw is the weight average molar mass and Mn is the number average molar mass, both measured by GPC (gel permeation chromatography), as explained in the examples. In certain embodiments, Mw/Mn values for the polyethylene compositions of the present technology range from 15 to 30, such as from 15 to 25. In certain embodiments, the polyethylene compositions of the present invention have at least one of the following additional features:
a Mw equal to or lower than 300000 g/mol, such as equal to or lower than 250000 g/mol and from 250000 to 180000 g/mol;
a MIP of 1.2-2.5 g/10 min;
a comonomer content of from 1.5 to 6% by weight with respect to the total weight of the composition.

The comonomer or comonomers present in the ethylene copolymers are generally selected from olefins having formula CH$_2$=CHR wherein R is an alkyl radical, linear or branched, having from 1 to 10 carbon atoms such as propylene, butene-1, pentene-1,4-methylpentene-1, hexene-1, octene-1 and decene-1.

In some embodiments, the present technology encompasses compositions comprising:

A) 40-60% by weight of an ethylene homopolymer or copolymer (the homopolymer being preferred) with density equal to or greater than 0.960 g/cm$^3$ and melt flow index MIE at 190° C. with a load of 2.16 kg, according to ISO 1133, of 40-250 g/10 min.;

B) 40-60% by weight of an ethylene copolymer having a MIE value lower than the MIE value of A), preferably lower than 0.5 g/10 min.

The above percentages refer to the total weight of A)+B). The amount of comonomer in B) is, in certain embodiments, from 3 to 12% by weight with respect to the total weight of B).

The polyethylene compositions described herein can be advantageously used for producing protective coatings for metal pipes such as steel pipes. In certain embodiments, the compositions may be characterized by the following properties:

Tensile notch impact (T=−30° C.) of 150 kJ/m$^2$ or higher; and

Environmental stress crack resistance as measured by FNCT 4 MPa/80° C. of greater than 250 hours (h). The details of the above referenced test methods are given in the examples.

As previously mentioned, the polyethylene compositions of the present technology can be melt-processed at surprisingly high values with regards to shear rate without undergoing pressure oscillations and flow instabilities. Accordingly, the polyethylene compositions of the present disclosure may be characterized, in certain embodiments, with a SIC Index value from 3 to 5, such as from 3.5 to 4.5, wherein the SIC Index is the Shear-Induced Crystallization Index, determined according to the following relation:

$$\text{SIC Index} = (t_{onset,SIC}@1000 \times t_{onset,quiescent})/(MIF)$$

where $t_{onset,SIC}@1000$ is measured in seconds and is the time required for crystallization onset under a shear rate of 1000 s$^{-1}$, the $t_{onset,\ quiescent}$ is measured in seconds and is the crystallization onset time at a temperature of 125° C. under no shear as determined in isothermal mode by differential scanning calorimetry (DSC).

While no necessary limitation is known to exist in principle on the kind of polymerization processes and catalysts to be used, it has been found that the polyethylene composition of the present invention can be prepared by a gas phase polymerization process in the presence of a Ziegler-Natta catalyst, which may comprise the product of the reaction of an organometallic compound of Groups 1, 2 or 13 of the Periodic Table of Elements with a transition metal compound of Groups 4 to 10 of the Periodic Table of Elements (new notation). In some embodiments, the transition metal compound can be selected from Ti, V, Zr, Cr and Hf and supported on MgCl$_2$. In alternative embodiments, organometallic compounds such as organo-Al compounds may be utilized.

In further embodiments, the polyethylene compositions of the present technology may be produced by using a Ziegler-Natta polymerization catalyst, optionally supported on MgCl$_2$, and optionally comprising the product of the following reaction components:

a) a solid catalyst component comprising a Ti compound and an electron donor compound ED supported on MgCl$_2$;

b) an organo-Al compound; and optionally c) an external electron donor compound ED$_{ext}$.

The ED/Ti molar ratio, in some embodiments, ranges from 1.5 to 3.5 and the Mg/Ti molar ratio is higher than 5.5, such as from 6 to 80. Titanium compounds for use in the present technology include the tetrahalides and the compounds of the general formula TiX$_n$(OR$^1$)$_{4-n}$, where 0≤n≤3, X is a halogen such as chlorine, and R$^1$ is C$_1$-C$_{10}$ hydrocarbon group. The ED compound is generally selected from alcohols, ketones, amines, amides, nitriles, alkoxysilanes, aliphatic ethers, and esters of aliphatic carboxylic acids. In certain embodiments, esters such as alkyl esters of C1-C20 aliphatic carboxylic acids, including particular C1-C8 alkyl esters of aliphatic mono carboxylic acids such as ethyl acetate, methyl formate, ethyl formate, methyl acetate, propyl acetate, i-propyl acetate, n-butyl acetate and i-butyl acetate and C2-C20 aliphatic ethers such as tetrahydrofuran (THF) and dioxane may be used.

In some embodiments, MgCl$_2$ is the solid catalyst support, and minor amounts of additional carriers can optionally be used. The MgCl$_2$ can be used as commercially prepared or obtained from Mg compounds used as precursors that can be transformed into MgCl$_2$ by reaction with halogenating compounds. The use of MgCl$_2$ in active form as a support for Ziegler-Natta catalysts is described, for instance, in U.S. Pat. Nos. 4,298,718 and 4,495,338. It is known from these patents that magnesium dihalides in active form may be used as supports or co-supports in components of catalysts for the polymerization of olefins. In the X-ray spectra of magnesium dihalides in active form(s) the most intense line is diminished in intensity and replaced by a halo whose maximum intensity is displaced towards lower angles relative to that of the most intense line.

In certain embodiments, the preparation of the polyethylene compositions of the present technology involves catalysts where the solid catalyst component a) is obtained by first contacting a titanium compound with the MgCl$_2$, or a precursor Mg compound, optionally in the presence of an inert medium, resulting in an intermediate product a') containing a titanium compound supported on MgCl$_2$, where intermediate product a') is then contacted with the ED compound in the reaction mixture alone or in a mixture with other compounds in which it represents the main component, optionally in the presence of an inert medium.

The term "main component" refers to the fact that the ED compound is the main component reaction mixture in terms of molar amount, with respect to the other possible compounds excluded inert solvents or diluents used to handle the contact mixture. The ED treated product can then be subject to washings with the proper solvents in order to recover the final product. If needed, the treatment with the ED compound desired can be repeated one or more times.

In certain embodiments, a precursor of MgCl$_2$ can be used as a starting Mg compound selected from Mg compounds of the general formula MgR'$_2$, where the R' groups can independently be C1-C20 hydrocarbon groups that are optionally substituted, OR groups, OCOR groups, chlorine, in which R is a C1-C20 hydrocarbon groups that are optionally substituted, where the R' groups are not simultaneously chlorine. Also suitable as precursors are the Lewis adducts between MgCl$_2$ and suitable Lewis bases such as MgCl$_2$ (R"OH)$_m$ adducts, in which R" groups are C1-C20 hydrocarbon groups, including C1-C10 alkyl groups, and m is from 0.1 to 6, including from 0.5 to 3 and from 0.5 to 2. Adducts of this type may be obtained by mixing alcohols and MgCl$_2$ in the presence of an inert hydrocarbon immiscible with the adduct under stirring conditions at the melting temperature of the adduct (generally around 100-130° C.). The emulsion is then quickly quenched, thereby causing the solidification of the adduct in form of spherical particles. Representative methods for the preparation of these spherical adducts are reported for example in U.S. Pat. Nos. 4,469,648 and 4,399,054 and WIPO Pat App. Pub. No. WO 1998/44009. Another method for spherulization of adducts is the spray cooling described in U.S. Pat. Nos. 5,100,849 and 4,829,034.

In certain embodiments, $MgCl_2.(EtOH)_m$ adducts in which "m" is from 0.15 to 1.7 are used. These compounds may be obtained by treating the adducts with a higher alcohol content in a thermal dealcoholation process carried out in under nitrogen flow at temperatures between 50 and 150° C. until the alcohol content is reduced to a value of "m" as described in EP Pat. Doc. No. 395083. The dealcoholation can also be carried out chemically by contacting the adduct with compounds capable to react with the alcohol groups. The dealcoholated adducts may be characterized by a porosity (measured by mercury method) due to pores with radius up to 0.1 μm ranging from 0.15 to 2.5 $cm^3/g$, including from 0.25 to 1.5 $cm^3/g$.

In certain embodiments, the dealcoholation reaction may be carried out simultaneously with the step of reaction involving the use of a titanium compound. Accordingly, these adducts may be reacted with the $TiX_n(OR^1)_{4-n}$ compound (or possibly mixtures thereof) mentioned above such as titanium tetrachloride. The reaction with the Ti compound can be carried out by suspending the adduct in $TiCl_4$ under cold conditions. The mixture is then heated up to temperatures ranging from 80-130° C. and kept at this temperature for 0.5-2 hours. The treatment with the titanium compound can be carried out one or more times such as twice. It can also be carried out in the presence of an electron donor compound such as those mentioned above. At the end of the process the solid is recovered by separation of the suspension via the conventional methods (such as settling and removing of the liquid, filtration and/or centrifugation) and can be subjected to washings with solvents. Although the washings are typically carried out with inert hydrocarbon liquids, it is also possible to use polar solvents such as halogenated hydrocarbons.

As mentioned above, the intermediate product may then be brought into contact with the ED compound under conditions for fixing the solid with an effective amount of the electron donor. Due to the high versatility of this method, the amount of electron donor used can widely vary. As an example, it can be used in a molar ratio with respect to the Ti content in the intermediate product ranging from 0.5 to 20, including from 1 to 10. In certain embodiments, the contact may be carried out in a liquid medium such as a liquid hydrocarbon. The temperature at which the contact takes place can vary depending on the nature of the reagents, such as in a range from −10 to 150° C., including from 0 to 120° C. Temperatures that may cause the decomposition or degradation of any specific reagents should be avoided even if they fall within the specified temperature ranges. In addition, the time of treatment can based on conditions such as the nature of the reagents, temperature, concentration, etc. The contact step can last from 10 minutes to 10 hours, including from 0.5 to 5 hours and may be repeated one or more times. At the end of this step the solid is recovered by separation of the suspension via the conventional methods (such as settling and removing of the liquid, filtration and/or centrifugation) and can be subject to washings with solvents. Although the washings are typically carried out with inert hydrocarbon liquids, it is also possible to use more polar solvents such as halogenated or oxygenated hydrocarbons.

As previously mentioned, the solid catalyst component may be converted into catalysts for the polymerization of olefins by reacting it, according to known methods, with an organometallic compound of Group 1, 2 or 13 of the Periodic Table of Elements, such as with an Al-alkyl compound.

In some embodiments, the alkyl-Al compound may be chosen from among the trialkyl aluminum compounds such as triethylaluminum, triisobutylaluminum, tri-n-butylaluminum, tri-n-hexylaluminum and tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with the trialkyl aluminum compound(s).

In certain embodiments, the external electron donor compound $ED_{ext}$ that is used to prepare the Ziegler-Natta catalysts can be equal to or different from the ED used in the solid catalyst component a) and may be selected from the group consisting of ethers, esters, amines, ketones, nitriles, silanes and mixtures thereof. For example, C2-C20 aliphatic ethers and cyclic ethers having 3-5 carbon atoms such as tetrahydrofuran and dioxane may be used. Examples of the above described Ziegler-Natta catalysts and methods for their preparation are provided in WIPO Pat. App. Pub. No. WO 2004106388.

The catalyst may be prepolymerized according to known techniques, by producing reduced amounts of polyolefin such as polypropylene or polyethylene. The prepolymerization can be carried out before adding the electron donor compound ED, thereby subjecting to prepolymerization the intermediate product a'). Alternatively, it is possible to subject the solid catalyst component a) to prepolymerization. The amount of prepolymer produced may be up to 500 g per g of intermediate product a') or of component a), including from 0.5 to 20 g per g of intermediate product a').

The prepolymerization may be carried out with the use of a suitable cocatalyst such as organoaluminum compounds that can also be used in combination with an external electron donor compound as discussed above at temperatures from 0 to 80° C., including from 5 to 70° C., in the liquid or gas phase.

It has been found that by using the above described polymerization catalyst, the polyethylene compositions of the present disclosure can be prepared in a process comprising the following steps, in any mutual order:
a) polymerizing ethylene, optionally together with one or more comonomers, in a gas-phase reactor in the presence of hydrogen;
b) copolymerizing ethylene with one or more comonomers in another gas-phase reactor in the presence of an amount of hydrogen less than step a);
where in at least one of said gas-phase reactors the growing polymer particles flow upward through a first polymerization zone (riser) under fast fluidization or transport conditions, leave said riser and enter a second polymerization zone (downcomer) through which they flow downward under the action of gravity, leave said downcomer and are reintroduced into the riser, thus establishing a circulation of polymer between said two polymerization zones.

In the first polymerization zone (riser), fast fluidization conditions are established by feeding a gas mixture comprising one or more olefins (ethylene and comonomers) at a velocity higher than the transport velocity of the polymer particles. The velocity of the gas mixture may be between 0.5 and 15 m/s, such as between 0.8 and 5 m/s. The terms "transport velocity" and "fast fluidization conditions" are described, for example, in D. Geldart, Gas Fluidization Technology, page 155 et seq., J. Wiley & Sons Ltd., 1986. In the second polymerization zone (downcomer), the polymer particles flow under the action of gravity in a densified form, so that high values of density of the solid are reached (mass of polymer per volume of reactor), which approach the bulk density of the polymer. The polymer therefore flows vertically down through the downcomer in a plug flow (packed flow mode), so that only small quantities of gas are entrained between the polymer particles.

The process produces in step a) an ethylene polymer with a molecular weight lower than the ethylene copolymer obtained from step b). The polymerization of ethylene to produce a relatively low molecular weight ethylene polymer (step a) may, in certain embodiments, be performed upstream of the copolymerization of ethylene with a comonomer to produce a relatively high molecular weight ethylene copolymer (step b). In step a) a gaseous mixture comprising ethylene, hydrogen and an inert gas may therefore be fed to a first gas-phase reactor, such as a gas-phase fluidized bed reactor. The polymerization is carried out in the presence of the previously described Ziegler-Natta catalyst. In particular embodiments, no comonomer is fed to the first gas phase reactor and a highly crystalline ethylene homopolymer is obtained in step a). However, a minimal amount of comonomer may be fed such that the degree of copolymerization in step a) is limited so that the density of the ethylene polymer obtained in step a) is not less than 0.960 g/cm$^3$.

Hydrogen is fed in an amount depending on the specific catalyst used to obtain in step a) an ethylene polymer with a melt flow index MIE from 40-250 g/10 min. In order to obtain the MIE range, in some embodiments the hydrogen/ethylene molar ratio in step a) is from 0.5 to 3, the amount of ethylene monomer is 8 to 20% by volume, such as from 10 to 15% by volume, based on the total volume of gas present in the polymerization reactor. The remaining portion of the feeding mixture may comprise inert gases and one or more comonomers. Inert gases may be selected from nitrogen and saturated hydrocarbons such as propane. The operating temperature in the reactor of step a) is selected between 50 and 120° C., including between 65 and 100° C., while the operating pressure is between 0.5 and 10 MPa, such as between 2.0 and 3.5 MPa.

In some embodiments, the ethylene polymer obtained in step a) represents from 40 to 60% by weight of the total ethylene polymer produced in the overall process, i.e. in the first and second serially connected reactors. The ethylene polymer coming from step a) and the entrained gas are then passed through a solid/gas separation step, in order to prevent the gaseous mixture coming from the first polymerization reactor from entering the reactor of step b) (the second gas-phase polymerization reactor). The gaseous mixture can be recycled back to the first polymerization reactor, while the separated ethylene polymer is fed to the reactor of step b). In certain embodiments, a position for feeding the polymer into the second reactor is the connecting part between the downcomer and the riser, where the solid concentration is low, so that the flow conditions are not negatively affected.

In certain embodiments, the operating temperature in step b) may be in a range of 65 to 95° C., and the pressure in the range of 1.5 to 4.0 MPa. The second gas-phase reactor may produce a relatively high molecular weight ethylene copolymer by copolymerizing ethylene with one or more comonomers. In order to broaden the molecular weight distribution of the final ethylene polymer, the reactor of step b) can be operated by establishing different conditions of monomers and hydrogen concentration within the riser and the downcomer.

To this purpose, in step b) the gas mixture entraining the polymer particles and coming from the riser can be partially or totally prevented from entering the downcomer for obtaining two different gas composition zones. This process can be achieved by feeding a gas and/or a liquid mixture into the downcomer through a line placed at a suitable point of the downcomer, such as in the upper part. The gas and/or liquid mixture should have a suitable composition, different from that of the gas mixture present in the riser. The flow of gas and/or liquid mixture can be regulated so that an upward flow of gas counter-current to the flow of the polymer particles is generated, for instance at the top, acting as a barrier to the gas mixture entrained among the polymer particles coming from the riser. In some embodiments, a mixture with low content of hydrogen may be introduced in order to produce a higher molecular weight polymer fraction in the downcomer. One or more comonomers can be fed to the downcomer of step b), optionally together with ethylene, propane or other inert gases.

The hydrogen/ethylene molar ratio in the downcomer of step b) may be, in certain embodiment, between 0.05 and 0.4, the ethylene concentration from 1 to 20%, including 3-10%, by volume, and the comonomer concentration from 1 to 5% by volume, based on the total volume of gas present in the downcomer. The balance of the mixture may comprise propane or other inert gases. Since a very low molar concentration of hydrogen is present in the downcomer, by carrying out the process of the present technology it is possible to bond a relatively high amount of comonomer to the high molecular weight polyethylene fraction.

The polymer particles coming from the downcomer are reintroduced in the riser of step b). The concentration of the comonomer in the riser may be 1 to 5% by volume, based on the total volume of gas present in the riser. In certain embodiments, the comonomer content may be controlled in order to obtain the desired density of the final polyethylene. In the riser of step b) the hydrogen/ethylene molar ratio is in the range of 0.04 to 0.4 and the ethylene concentration between 5 and 15% by volume based on the total volume of gas present in the riser, while the balance of the mixture may comprise propane or other inert gases. More details on the polymerization process are provided in WIPO Pat. App. Pub. No. WO 199412568.

In some embodiments, the polyethylene compositions of the present disclosure may comprise additional additives. Such additives are, for example, heat stabilizers, antioxidants, UV absorbers, light stabilizers, metal deactivators, peroxide-decomposing compounds and basic costabilizers in amounts up to 10% by weight, including up to 5% by weight, and also fillers, reinforcing materials, plasticizers, lubricants, emulsifiers, pigments, optical brighteners, flame retardants, antistatics blowing agents, or combinations of these in total amounts of from 0.1 to 50% by weight, based on the total weight of the mixture. In a non-limiting example, the polyethylene composition of the present technology can contain carbon black in amounts of from 1 to 5% by weight with respect to the total weight of the composition. In further embodiments, the molding compositions of the present technology may be used for producing coatings on metal pipes, wherein the polyethylene composition may be molded in an extruder at temperatures in the range from 200 to 250° C. and extruded, through a nozzle onto the pipe surface. The surface of the pipe to be coated is optionally cleaned, for instance by sand blasting, and pretreated prior to coating.

The pretreatment can comprise a chemical treatment, for instance acid washing, and may comprise a protective layer, like an epoxy resin, and an adhesive layer such as a polyolefin (including but not limited to polyethylene that is optionally blended with olefin elastomer(s)) containing polar groups, such as a polyolefin grafted with polar compounds such as maleic anhydride. The compositions of the present disclosure can be laid directly on the surface of the pipe or on the pretreated surface of the pipe, such as on an adhesive layer previously laid on the pipe surface. The protective layer can be obtained by powder coating, for example, while the adhesive layer can be laid by extrusion. Extruders, such as single or twin screw extruders, may be used for laying the polyethylene composition of the present technology, and optionally adhesive layers known in the art.

EXAMPLES

The following examples are given to illustrate certain embodiments of the present technology. Unless differently stated, the following test methods are used to determine the properties reported in the detailed description and in the examples.

Density: Determined according to ISO 1183 at 23° C.

Molecular Weight Distribution Determination: The determination of the molar mass distributions and the means Mn, Mw, Mz and Mw/Mn derived therefrom was carried out by high-temperature gel permeation chromatography using a method described in ISO 16014-1, -2, -4 (2003). The specifics according to the ISO standards therein are as follows: the solvent is 1,2,4-trichlorobenzene (TCB), the temperature of apparatus and solutions 135° C. and as concentration detector a PolymerChar (Valencia, Paterna 46980, Spain) IR-4 infrared detector for use with TCB. A WATERS Alliance 2000 equipped with the following pre-column SHODEX UT-G and separation columns SHODEX UT 806 M (3×) and SHODEX UT 807 (Showa Denko Europe GmbH, Konrad-Zuse-Platz 4, 81829 Muenchen, Germany) connected in series were used. The solvent was vacuum distilled under nitrogen and stabilized with 0.025% by weight of 2,6-di-tert-butyl-4-methylphenol. The flowrate used was 1 ml/min, the injection was 500 μl and polymer concentration was in the range of 0.01%<conc.<0.05% w/w. The molecular weight calibration was established by using monodispersed polystyrene (PS) standards from Agilent Technologies (Boeblingen, Germany) in a range from 580 g/mol to 11600000 g/mol, optionally with hexadecane. The calibration curve was then adapted to polyethylene (PE) by means of the Universal Calibration method (Benoit et al., J. Polymer Sci., Phys. Ed., 5, 753(1967)). The Mark-Houwing parameters used were: for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Ober-Hilbersheim, Germany) respectively.

Shear-induced crystallization test: This method is utilized to determine the onset time of shear-induced crystallization (SIC) of the polymer, $t_{onset,SIC}$. Samples are melt-pressed at 200° C. for 4 min under 200 bar in a lab press to 1 mm thick-plaques. Disc specimens are cut-out with a diameter of 25 mm. The samples are inserted in the plate-plate oscillatory-shear rheometer. A Physica MCR 301 rotational rheometer from AntonPaar is used.

The sample is then molten inside the test-geometry at 190° C. for 4 min, cooled down at a rate of ~10K/min to the test temperature, T=125° C., and annealed for 5 min. Steady shear under constant shear rate is applied and the shear viscosity is monitored as a function of time. The experiment is repeated, applying each time a different shear-rate ranging from 0.05 to 0.5 s$^{-1}$. The onset time for SIC, $t_{onset,SIC}$, is taken at the point where the viscosity has increased at 50% of its steady-state value η at 125° C. The steady-state value is the average of the steady-shear melt viscosity measured at the specific temperature.

The plot of log$t_{onset,SIC}$ vs. log shear-rate provides a linear function (of type y=Ax+B) which is extrapolated to a shear rate of 1000 s$^{-1}$ (process-relevant) to determine the value of $t_{onset,SIC}$@1000. The SIC Index is then calculated according to the following relation:

$$\text{SIC Index}=(t_{onset,SIC}@1000 \times t_{onset,quiescent})/(\text{MIF})$$

The $t_{onset, quiescent}$ (in sec) is the crystallization onset at temperature of 125° C. under quiescent conditions, i.e. no shear, as measured in isothermal mode in a differential-scanning-calorimetry apparatus, DSC. MIF is the melt flow index (g/10 min) measured at T =190° C. with a 21.6 kg load, according to ISO 1133, as described in:

I. Vittorias, *Correlation among structure, processing and product properties*, Würzburger Tage 2010, Wolfgang Kunze TA Instruments, Germany.

Wo D L, Tanner R I (2010), *The impact of blue organic and inorganic pigments on the crystallization and rheological properties of isotactic polypropylene*, Rheol. Acta 49, 75.

Derakhshandeh M., Hatzikiriakos S. G., *Flow-induced crystallization of high-density polyethylene: the effects of shear and uniaxial extension*, Rheol. Acta, 51, 315-327, 2012.

Isothermal DSC: The $t_{onset,quiescent}$, the onset time when no deformation is applied at 125° C., is determined by the iso-DSC (isothermal Differential Scanning calorimetry) method. It is measured at 125° C. in a TA Instruments Q2000 DSC apparatus. The determination of the $t_{onset,quiescent}$ is performed using TA Universal Analysis 2000 software. The sample preparation and set-up follows the DIN EN ISO 11357-1:2009 and ISO 11357-3:1999.

Complex shear viscosity: Measured at angular frequency of 0.02 rad/s and 190° C. as follows: Samples are melt-pressed for 4 min under 200° C. and 200 bar into plates of 1 mm thickness. Disc specimens of a diameter of 25 mm are stamped and inserted in the rheometer, which is pre-heated at 190° C. The measurement can be performed using any rotational rheometer commercially available such as the Anton Paar MCR 300, with a plate-plate geometry. A frequency-sweep is performed (after 4 min of annealing the sample at the measurement temperature) at T=190° C. under a constant strain-amplitude of 5% and measuring and analyzing the stress response of the material in the range of excitation frequencies ω from 670 to 0.02 rad/s. Software is utilized to calculate the rheological properties, i.e. the storage-modulus, G', the loss-modulus, G", the phase lag δ (=arctan(G"/G')) and the complex viscosity, η*, as a function of the applied frequency, namely $\eta^*(\omega)=[G'(\omega)^2+G''(\omega)^2]^{1/2}/\omega$. The value of the latter at an applied frequency ω of 0.02 rad/s is the eta (0.02).

Melt flow index: Determined according to ISO 1133 at 190° C. with the specified load.

Long Chain Branching index (LCBI): The LCB index corresponds to the branching factor g', measured for a molecular weight of 10$^6$ g/mol. The branching factor g', which allows for the determination of long-chain branches at high Mw, was measured by GPC coupled with multi-angle laser-light scattering (MALLS). The parameter g' is the ratio of the measured mean square radius of gyration to that of a linear polymer having the same molecular weight. Linear molecules show a g' value of 1, while values less than 1 indicate the presence of LCB. Values of g' as a function of molecular weight, M, were calculated from the equation:

$$g'(M) = <Rg^2>_{sample,M} / <Rg^2>_{linear\ ref.,M}$$

where $<Rg^2>,M$ is the root-mean-square radius of gyration for the fraction of mol. weight M.

The radius of gyration for each fraction eluted from the GPC (as described above but with a flow-rate of 0.6 ml/min and a column packed with 30 μm particles) is measured by analyzing the light scattering at the different angles. Therefore, from this MALLS setup it is possible to determine the molecular weight M and $<Rg^2>_{sample,M}$ and to define a g' value at a measured M=$10^6$ g/mol. The $<Rg^2>_{linear\ ref.,M}$ is calculated by the established relation between radius-of-gyration and molecular weight for a linear polymer in solution (Zimm and Stockmayer W H 1949)) and confirmed by measuring a linear PE reference with the same apparatus and methodology described. The same protocol is described in the following documents.

Zimm B H, Stockmayer W H (1949) *The dimensions of chain molecules containing branches and rings.* J Chem Phys 17

Rubinstein M., Colby R H. (2003), *Polymer Physics*, Oxford University Press

Comonomer content: The comonomer content is determined by means of IR in accordance with ASTM D 6248 98, using a Bruker Tensor 27 FT-IR spectrometer calibrated with a chemometric model for determining ethyl- or butyl side chains in PE for butene or hexene as the comonomer, respectively. The result is compared to the estimated comonomer content derived from the mass-balance of the polymerization process and was found to be in agreement.

Notched Tensile Impact Test: The tensile-impact strength is determined using ISO 8256:2004 with type 1 double notched specimens according to method A. The test specimens (4×10×80 mm) are cut from a compression molded sheet which has been prepared according to ISO 1872-2 requirements (average cooling rate of 15 K/min and high pressure during cooling phase). The test specimens are notched on two sides with a 45° V-notch. The depth is 2±0.1 mm and the curvature radius on notch dip is 1.0±0.05 mm. The free length between grips is 30±2 mm. Before measurement, all test specimens are conditioned at a constant temperature of −30° C. over a period from 2 to 3 hours. The procedure for measurements of tensile impact strength including energy correction following method A is described in ISO 8256.

Environmental stress cracking resistance according to full notch creep test (FNCT): The environmental stress cracking resistance of polymer samples is determined in accordance with ISO 16770 (FNCT) in aqueous surfactant solution. From the polymer sample a compression moulded 10 mm thick sheet was prepared. The bars with squared cross section (10×10×100 mm) are notched using a razor blade on four sides perpendicular to the stress direction. A notching device described as described in M. Fleissner, *Kunststoffe* 77, 45 (1987), is used to introduce the notch at a depth of 1.6 mm. The load applied is calculated from tensile force divided by the initial ligament area. The ligament area is defined as the remaining area equal to the total cross-section area of the specimen minus the notch area. For an FNCT specimen: 10×10 mm²-4 times of trapezoid notch area =46.24 mm² (the remaining cross-section for the failure process/crack propagation). The test specimen is loaded under standard conditions as suggested by ISO 16770 with a constant load of 4 MPa at 80° C. in a 2% by weight water solution of the non-ionic surfactant ARKOPAL N100. The time elapsed until the rupture of test specimen was measured.

Example 1 and Comparative Examples 1 and 2

Process Setup: In Example 1 the process of the invention was carried out under continuous conditions in a plant comprising two serially connected gas-phase reactors, as shown in FIG. 1.

Example 1

The solid catalyst component was prepared as described in Example 15 of WIPO Pat. App. Pub. No. WO2004106388.

Polymerization: 20 g/h of prepolymerized solid catalyst component was prepared as described above and was fed, using 5 kg/h of liquid propane, to a precontacting apparatus with dosing using triethylaluminum (TEA). The weight ratio between the aluminum alkyl (TEA) and the solid catalyst component was 3:1. The precontacting step was carried out under stirring at 50° C. with a total residence time of 120 minutes.

The catalyst enters the first gas-phase polymerization reactor 1 of FIG. 1 via line 10. In the first reactor ethylene was polymerized using H$_2$ as molecular weight regulator and in the presence of propane as inert diluent. 40 kg/h of ethylene and 130 g/h of hydrogen were fed to the first reactor via line 9. No comonomer was fed to the first reactor.

The polymerization was carried out at a temperature of 80° C. and at a pressure of 2.9 MPa. The polymer obtained in the first reactor was discontinuously discharged via line 11, separated from the gas into the gas/solid separator 12, and reintroduced into the second gas-phase reactor via line 14. The polymer produced in the first reactor had a melt index MIE of about 80 g/10 min and a density of 0.969 kg/dm³.

The second reactor was operated under polymerization conditions of about 80° C. and a pressure of 2.5 MPa. 16 kg/h of ethylene, 1 g/h of hydrogen and 4.3 kg/h of 1-hexene were introduced in the downcomer 33 of the second reactor via line 46. 5 kg/h of propane, 18 kg/h of ethylene and 2 g/h of hydrogen were fed through line 45 into the recycling system.

In order to broaden the molecular weight distribution of the final ethylene polymer, the second reactor was operated by establishing different conditions of monomers and hydrogen concentration within the riser 32 and the downcomer 33. This is achieved by feeding via line 52 and 75 kg/h of a liquid stream (liquid barrier) into the upper part of the downcomer 33. The liquid stream has a composition different from that of the gas mixture present in the riser. The different concentrations of monomers and hydrogen within the riser, the downcomer of the second reactor and the composition of the liquid barrier are indicated in Table 1. The liquid stream of line 52 comes from the condensation step in the condenser 49, at working conditions of 50° C. and 2.5 MPa, where a part of the recycle stream is cooled and partially condensed. As shown in the FIGURE, a separating vessel and a pump are placed, in the order, downstream of the condenser 49. The final polymer was discontinuously discharged via line 54. The polymerization process in the second reactor produced relatively high molecular weight polyethylene fractions. In Table 1 the properties of the final product are specified. It can be seen that the melt index of the final product is decreased as compared to the ethylene resin produced in the first reactor, showing the formation of high molecular weight fractions in the second reactor.

The first reactor produced around 51% by weight (split wt %) of the total amount of the final polyethylene resin produced by both first and second reactors. At the same time, the obtained polymer is endowed with a relatively broad molecular weight distribution as witnessed by a ratio MIF/MIP equal to 20.

Comparative Example 1

The polymer of this comparative example is a Ziegler-Natta polyethylene composition, available on the market with the commercial name Petrothene LR 5280 E (Equistar).

Comparative Example 2

The polymer of this comparative example is a Ziegler-Natta polyethylene composition containing carbon black, available on the market with the commercial name H E3450 (Borealis).

TABLE 1

|  | Ex. 1 | Comp. 1 | Comp. 2 |
|---|---|---|---|
| Operative conditions first reactor |  |  |  |
| $H_2/C_2H_4$ Molar ratio | 2.2 | — | — |
| $C_2H_4$ % | 10.3 | — | — |
| Split (wt %) | 51 | — | — |
| Operative conditions second reactor |  |  |  |
| $H_2/C_2H_4$ Molar ratio riser | 0.08 | — | — |
| $C_2H_4$ % riser | 8.3 | — | — |
| $C_6H_{12}$ % riser | 1.9 | — | — |
| $H_2/C_2H_4$ Molar ratio downcomer | 0.12 | — | — |
| $C_2H_4$ % downcomer | 3.8 | — | — |
| $C_6H_{12}$ % downcomer | 2.18 | — | — |
| $H_2/C_2H_4$ Molar ratio barrier | 0.010 | — | — |
| $C_2H_4$ % barrier | 5.1 | — | — |
| $C_6H_{12}$ % barrier | 3.1 | — | — |
| Final Polymer properties |  |  |  |
| MIP [5 kg] (g/10 min.) | 1.9 | 1.2 | 1.9 |
| MIF [21.6 kg] (g/10 min.) | 38 | 28 | 40 |
| MIF/MIP | 20 | 23 | 22 |
| Density (g/cm³) | 0.943 | 0.950 | 0.949 |
| Mw [g/mol] | 211114 | 236463 | 187561 |
| Mz [g/mol] | 1232440 | 1095640 | 729704 |
| Mw/Mn | 21 | 23.09 | 30.28 |
| LCBI | 0.63 | 0.63 | 0.62 |
| Comonomer content IR [% by weight] | 3.7 | — | — |
| SIC index | 4.0 | — | — |
| Eta (0.02) | 31100 | 44900 | 28000 |
| Tensile Notch Impact T = −30° C. [kJ/m²] | 155 | 84 | — |
| FNCT 4 MPa/80° C. (hours)* | 257 | 51.5 | 120 |

Notes:
$C_2H_4$ = ethylene;
$C_6H_{12}$ = hexene;
*aqueous solution of 2% Arkopal N100

What is claimed is:

1. A polyethylene composition comprising:
   1) a density from 0.940 to 0.948 g/cm³ as determined according to ISO 1183 at 23° C.;
   2) a MIF/MIP ratio from 15 to 25, where MIF is the melt flow index at 190° C. with a load of 21.60 kg, and MIP is the melt flow index at 190° C. with a load of 5 kg, both determined according to ISO 1133;
   3) a MIF value from 30 to 45 g/10 min;
   4) a $M_z$ value equal to or greater than 1000000 g/mol;
   5) a long-chain branching index, LCBI, equal to or greater than 0.55;
      wherein LCBI is the ratio of the measured mean-square radius of gyration $R_g$, measured by GPC-MALLS, to the mean-square radius of gyration for a linear PE having the same molecular weight.

2. The polyethylene composition of claim 1, having at least one of the following additional features:
   a Mw value equal to or lower than 300000 g/mol;
   a Mw/Mn value from 15 to 30;
   a MW value from 1.2-2.5 g/10 min;
   a SIC Index value from 3 to 5;
      wherein the SIC Index is the Shear-Induced Crystallization Index, determined according to the following relation:

$$\text{SIC Index} = (t_{onset,SIC}@1000 \times t_{onset,quiescent})/(\text{MIF})$$

where $t_{onset,SIC}@1000$ is measured in seconds and is the time required for crystallization onset under a shear rate of 1000 s⁻¹, the $t_{onset,quiescent}$ is measured in seconds and is the crystallization onset time at temperature of 125° C. under no shear, as determined in isothermal mode by differential scanning calorimetry.

3. The polyethylene composition of claim 1, comprising:
   A) 40-60 % by weight of an ethylene homopolymer or copolymer with a density equal to or greater than 0.960 g/cm³ and melt flow index MIE at 190° C. with a load of 2.16 kg, according to ISO 1133, of 40-250 g/10 min;
   B) 40-60% by weight of an ethylene copolymer having a MIE value lower than the MIE value of A).

4. A metal pipe coated with the polyethylene composition of claim 1.

5. The polyethylene of claim 1, wherein the MIF/MIP ratio is from 19 to 23.

6. The polyethylene of claim 1, wherein the MIF value is from 35 to 40 g/10 min.

7. The polyethylene of claim 1, wherein the LCBI is greater than 0.60.

8. The polyethylene of claim 1, wherein the $M_w$ value is from 180,000 to 250,000 g/mol.

9. The polyethylene of claim 1, wherein the $M_w/M_n$ value is from 15 to 25.

10. The polyethylene of claim 1, wherein the SIC Index value is from 3.5 to 4.5.

11. The polyethylene of claim 1, wherein the density is from 0.940 to 0.945 g/cm³.

12. The polyethylene composition of claim 1, further comprising:
    6) eta (0.02) from 25,000 to 35,000 Pa·s;
    wherein eta (0.02) is the complex shear viscosity at an angular frequency of 0.02 rad/s, measured with dynamic oscillatory shear in a plate-plate rotational rheometer at a temperature of 190° C.

13. The polyethylene of claim 12, where the eta (0.02) is from 28,000 to 33,000 Pa·s.

14. The polyethylene composition of claim 1, comprising one or more ethylene copolymers.

15. The polyethylene composition of claim 14, comprising a comonomer content of 1.5 to 6% by weight.

16. The polyethylene composition of claim 1, where the composition is obtained by using a Ziegler-Natta polymerization catalyst.

17. The polyethylene composition of claim 16, where the Ziegler-Natta polymerization catalyst comprises the product of reaction of:
   a) a solid catalyst component comprising a Ti compound supported on $MgCl_2$, the component being obtained by contacting the titanium compound with the $MgCl_2$, or a precursor Mg compound, optionally in the presence of an inert medium, for obtaining an intermediate product a'), then subjecting a') to prepolymerization and contact with an electron donor compound;
   b) an organo-Al compound; and
   c) optionally an external electron donor compound.

18. A process for coating metal pipes, comprising a step wherein the polyethylene composition of claim 1 is molten in an extruder and extruded onto the pipe surface, where the pipe surface being optionally pretreated.

19. A process for preparing the polyethylene composition of claim 1, where all the polymerization steps are carried out in the presence of a Ziegler-Natta polymerization catalyst supported on $MgCl_2$.

20. The process of claim 19, comprising the following steps, in any mutual order:
   a) polymerizing ethylene, optionally together with one or more comonomers, in a gas-phase reactor in the presence of hydrogen;
   b) copolymerizing ethylene with one or more comonomers in another gas-phase reactor in the presence of an amount of hydrogen less than step a);
   where in at least one of said gas-phase reactors the growing polymer particles flow upward through a first polymerization zone under fast fluidization or transport conditions, leave the riser and enter a second polymerization zone through which they flow downward under the action of gravity, leave the second polymerization zone and are reintroduced into the first polymerization zone for establishing a circulation of polymers between the two polymerization zones.

* * * * *